(12) United States Patent
Lee

(10) Patent No.: US 7,215,676 B2
(45) Date of Patent: May 8, 2007

(54) METHOD OF CONVERTING ATM CELLS IN ATM NETWORK SYSTEM

(75) Inventor: Byung Cheon Lee, Anyang (KR)

(73) Assignee: LG Nortel Co., Ltd., Soeul (KR)

( * ) Notice: Subject to any disclaimer, the term of this patent is extended or adjusted under 35 U.S.C. 154(b) by 949 days.

(21) Appl. No.: 10/029,302

(22) Filed: Dec. 28, 2001

(65) Prior Publication Data

US 2002/0085564 A1    Jul. 4, 2002

(30) Foreign Application Priority Data

Dec. 30, 2000 (KR) .......................... P2000-0086760

(51) Int. Cl.
*H04L 12/56* (2006.01)

(52) U.S. Cl. ............................ 370/395.5; 370/395.64; 370/395.65

(58) Field of Classification Search ............ 370/395.6, 370/395.64, 395.65
See application file for complete search history.

(56) References Cited

U.S. PATENT DOCUMENTS

| | | | | |
|---|---|---|---|---|
| 5,642,347 A | * | 6/1997 | Buckland | 370/242 |
| 5,805,821 A | * | 9/1998 | Saxena et al. | 709/231 |
| 5,867,509 A | * | 2/1999 | Tanaka | 714/758 |
| 6,108,336 A | * | 8/2000 | Duault et al. | 370/395.6 |
| 6,185,209 B1 | * | 2/2001 | Wicklund | 370/395.71 |
| 6,449,254 B1 | * | 9/2002 | Hadjiahmad | 370/235 |
| 6,711,126 B1 | * | 3/2004 | Besset-Bathias | 370/229 |
| 6,879,569 B2 | * | 4/2005 | Jeong et al. | 370/328 |
| 2005/0238027 A1 | * | 10/2005 | Skarpness et al. | 370/395.6 |

* cited by examiner

*Primary Examiner*—Hassan Kizou
*Assistant Examiner*—Anthony Sol
(74) *Attorney, Agent, or Firm*—Ked & Associates, LLP

(57) ABSTRACT

A method of converting AAL2 cells that includes an original user data set into AAL5 cells and another method of converting AAL5 cells that includes an original user data set into AAL2 cells are disclosed. In the method of converting AAL2 cells, the length of the data subset included in each AAL5 cell generated is stored in a memory. Therefore, it is not necessary to store all the payloads of generated cells. When a last CPS packet is extracted, a total length of the original user data can be found using a set of lengths stored in the memory. As a result, the present invention requires only a small memory space, and any unnecessary delay problem is eliminated.

18 Claims, 6 Drawing Sheets

METHOD OF CONVERTING ATM CELLS IN ATM NETWORK SYSTEM

This application claims the benefit of the Korean Application No. P2000-86760 filed on Dec. 30, 2000, which is hereby incorporated by reference.

BACKGROUND OF THE INVENTION

1. Field of the Invention

The present invention relates to an Asynchronous Transfer Mode (ATM) network system, and more particularly, to a method of converting one or more ATM cells in an ATM network system.

2. Discussion of the Related Art

In general, the ATM Adaptation Layer (AAL) provides support for higher-layer services such as signaling, circuit emulation, voice, and video. AALs also support packet-based services, such as IP, LANs, and frame relay.

There are four different types of the currently standardized AALs: AAL1, AAL2, AAL3/4, and AAL5. First of all, AAL2 supports ATM transport of connection-oriented Variable Bit Rate (VBR) packetized voice and video.

On the other hand, the Common Part (CP) AAL5 supports VBR traffic, both connection-oriented and connectionless. Support for connectionless or connection-oriented service is provided at the Service Specific Convergence Sublayer (SSCS) level. However, despite of the simplicity of AAL5, AAL5 is now coming under criticism for its relatively inefficient operation, especially, for the mix of packet sizes typically used on the Internet.

FIG. 1 illustrates an existing ATM network system for converting one or more AAL2 type ATM cells (hereinafter, "AAL2 cells") to one or more AAL5 type ATM cells (hereinafter, AAL5 cell) or vice versa.

The system includes a first ATM cell converter 10 receiving one or more AAL2 cells and converting them into one or more AAL5 cells, and it further includes a second ATM cell converter 12 converting one or more AAL5 cells to one or more AAL2 cells. Lastly, the system includes an ATM switch 11 that switches each ATM cell (AAL5 cell) in an ATM level.

When the first ATM cell converter 10 receives one or more AAL2 cells, it extracts one or more Common Part Sublayer packets (CPS-Packets). Then it converts the extracted packets to one or more AAL5 cells and transmits the AAL5 cells to the ATM switch 11 in order switch each AAL5 cell in an ATM level. Next, the ATM switches the AAL5 cell and sends each AAL5 cell to the second ATM cell converter 12.

The ATM network system shown in FIG. 1 is used for transmitting a call related traffic message or signal control message in an IMT-2000 system including a Base Transceiver Station (BTS), a Radio Network Controller (RNC), and a Core Network (CN).

In the IMT-2000 system, BTS is connected to RNC through E1 (2.048 Mbps) line, and RNC is connected to CN through a Synchronous Transfer Module 1 (STM-1) line (155 Mbps). And a 53 bytes ATM cell transmits through those lines. In order to achieve higher efficiencies of the lines, the standards have decided to send a traffic message with AAL2 cells and a control message with AAL5 cells.

Namely, the standards have ruled that the traffic link interface and the signal link interface of the IMT-2000 should be AAL2 and AAL5, respectively. Even though a processor that handles both of the traffic and signal messages should be able to provide both of AAL2 and AAL5 protocols, such processor usually provides only a single AAL protocol. For this reason, some system developers often use a new type of the ATM cell having a system-preferred format.

The apparatus and method of converting one or more ATM cells in an ATM network system according to the prior art introduce several disadvantages. For converting N AAL5 cells including a user data set to AAL2 cells, the second ATM cell converter 12 must store all the AAL5 cells in a memory because the length-indicating field is included in the last AAL5 cell. Therefore, it requires a large amount of memory space and an unnecessary delay.

For converting AAL2 cells to AAL5 cells, similar problem will occur. When the first ATM cell converter 10 receives more than one AAL2 cells including a user data set, it initially generates more than one CPS packets. Thereafter, the first ATM cell converter 10 must store all the packets generated in order to convert them to AAL5 cells. This also requires a large memory space and an unnecessary delay for processing the cells in the system.

SUMMARY OF THE INVENTION

Accordingly, the present invention is directed to a method of converting ATM cells in an ATM network system that substantially obviates one or more problems due to limitations and disadvantages of the related art.

An object of the present invention is to provide a method of converting one or more AAL2 cells to one or more AAL5 cells in an ATM network system that can increase the cell transmission speed and prevents any unnecessary delays.

Another object of the present invention is to provide a method of converting one or more AAL5 cells to one or more AAL2 cells in an ATM network system that does not require a large memory space and prevents any unnecessary delays.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of converting more than one AAL2 cells in an ATM network system includes the steps of (a) receiving one or more AAL2 cells that include a CPS packet including one of N data subsets of an original user data set; and (b) extracting the CPS packet from the one or more AAL2 cells received in the step (a).

The method further includes (c) generating an AAL5 cell by adding an ATM header to the data subset included in the CPS packet; (d) storing intermediate CRC and length values of the data subset included in the AAL5 cell generated in the step (c) in a memory; and (e) repeating the steps (a) to (d) until the CPS packet extracted in the step (b) is a final CPS packet that includes an Nth data subset having its size of n bytes. The method further includes (f) calculating total CRC and length values of the original user data set; (g) generating an Nth AAL5 cell corresponding to the final CPS packet by adding a trailer containing the total values to a payload containing the Nth data subset if $1 \leq n \leq 40$; (h) generating an Nth AAL5 cell that includes the Nth data subset if 41≦n≦48; and (i) generating an (N+1)th AAL5 cell that includes a trailer containing the total values.

In another aspect of the present invention, a method of converting AAL5 cells in an ATM network system includes the steps of (a) receiving a first AAL5 cell that includes a first payload including a first data subset of an original user data set; and (b) storing the first payload in a memory if the first cell is not a final AAL5 cell.

The method further includes the steps of (c) receiving a next AAL5 cell that includes a next payload including a next data subset of the original user data set; (d) generating a CPS packet by adding a packet header to the payload stored in the memory if the AAL5 cell received in the step (c) is not the final AAL5 cell; (e) emptying the memory and storing the next payload in the memory; (f) recording the length of the payload included in the generated packet; (g) generating one or more AAL2 cells corresponding to the CPS packet generated; and (h) repeating the steps (c) to (g) until the next AAL5 cell received in the step (c) is the final AAL5 cell that includes a final payload.

The method further includes the steps of (i) determining a final length by subtracting each length recorded in the step (f) from a total length of the user data set, the total length being included in the final AAL5 cell; (j) generating a CPS packet by adding a packet header to the payload recently stored in the memory in the step (e) if the final length is greater than 48; (k) extracting a final data subset of the original user data set from the final payload; and (l) generating a final CPS packet by adding a packet header to the extracted final data subset.

The method further includes the steps of generating one or more AAL2 cells corresponding to the packet generated in the step (j); and generating one or more AAL2 cells corresponding to the final packet generated in the step (l).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
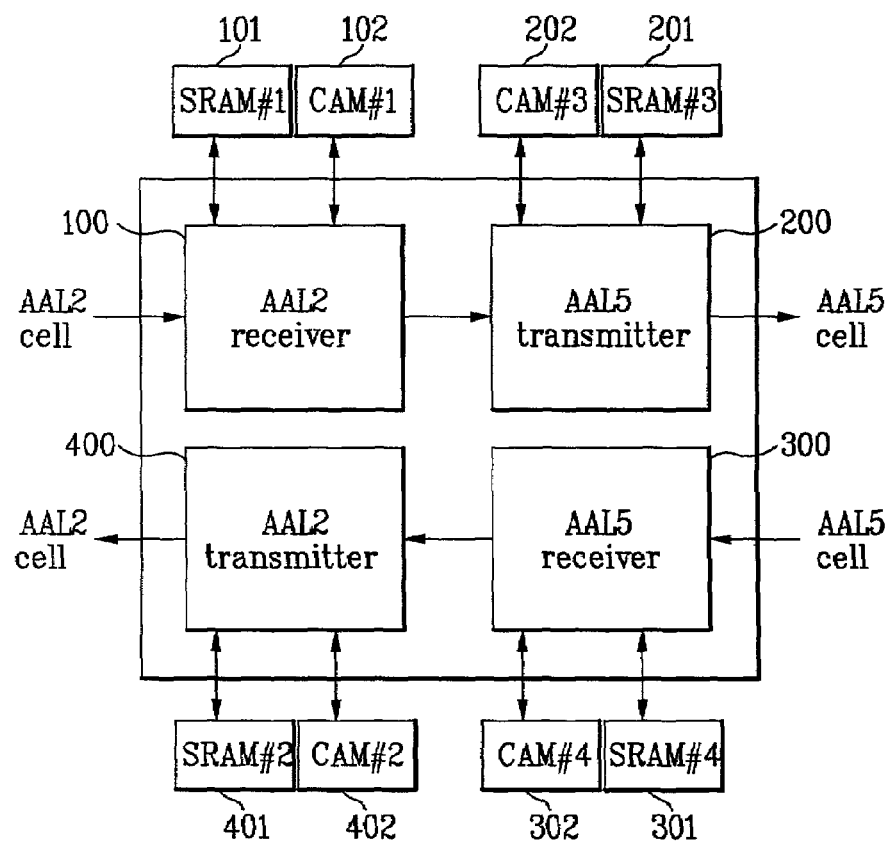
FIG. 2 illustrates an apparatus of converting AAL2 cells to AAL5 cells or vice versa in accordance with the present invention.

FIG. 2 illustrates an apparatus for converting one or more ATM cells in an ATM network system in accordance with the present invention. As shown in the figure, the apparatus includes an AAL2 receiver 100 for receiving one or more AAL2 type ATM cells (hereinafter, "AAL2 cells" and for generating one or more Common Part Sublayer (CPS) packets and an AAL5 transmitter 200 for receiving the AAL2 CPS packets and for generating one or more AAL5 type ATM cells (hereinafter, "AAL5 cells" corresponding to the CPS packets.

The system further includes an AAL5 receiver 300 for receiving one or more AAL5 cells and for generating one or more CPA packets and an AAL2 transmitter 400 for generating one or more AAL2 cells with CPS packets generated.

Figure 1:
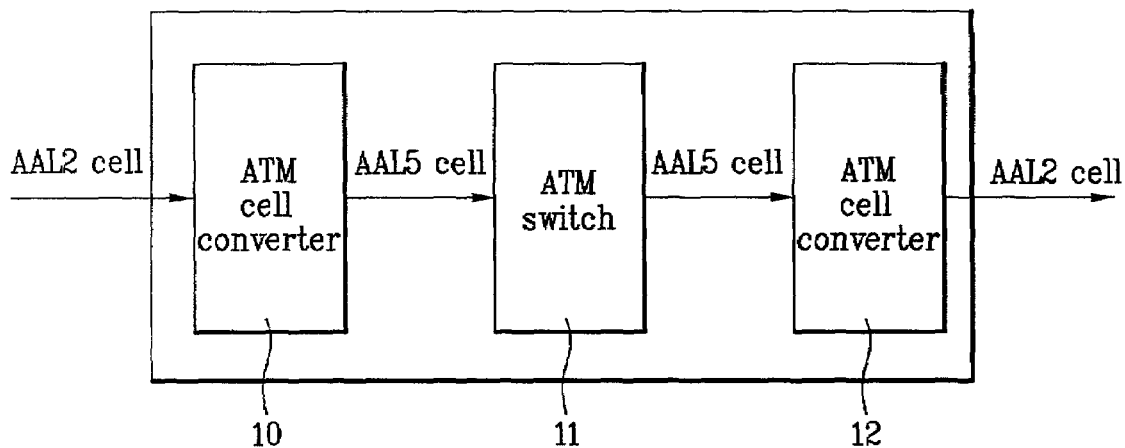
FIG. 1 illustrates an existing system for converting AAL2 cells to AAL5 cells or vice versa in accordance with the related art.

As shown in FIG. 1, each element included in the apparatus shown in FIG. 2 is connected to a SRAM and a Content Addressable Memory (CAM), respectively.

First, the SRAM 101 and CAM 102 coupled to the AAL2 receiver 100 store the data and the parameters necessary for demultiplexing the AAL2 cells in the AAL2 receiver 100.

Figure 4:
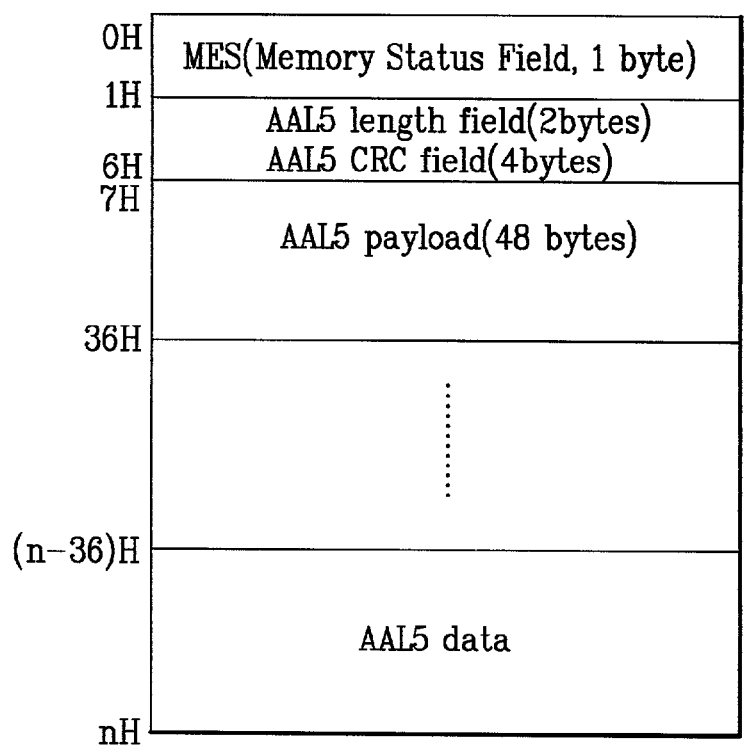
FIG. 4 illustrates the SRAM 201 of the apparatus shown in FIG. 2.

Second, the SRAM 201 coupled to the AAL5 transmitter 200 stores a length-indicating field and a CRC field of each CPS packet, but not user data. Similarly, the CAM 202 coupled to the AAL5 transmitter 200 stores the parameters necessary for converting the CPS packets to the AAL5 cells. FIG. 4 illustrates the SRAM 301 of the apparatus shown in FIG. 2.

Figure 3:
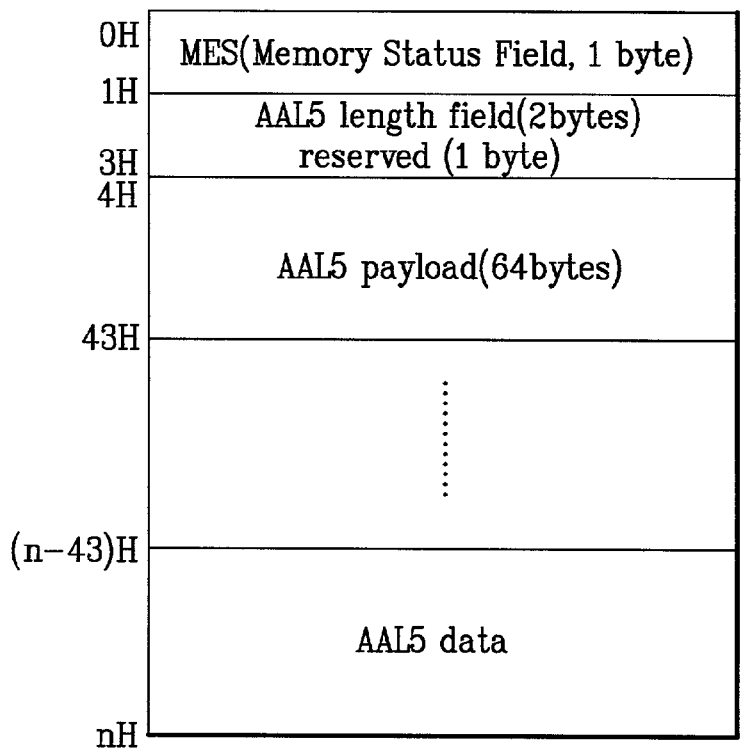
FIG. 3 illustrates the SRAM 301 of the apparatus shown in FIG. 2.

Third, the SRAM 301 coupled to the AAL5 receiver 300 stores the length-indicating information and the most recent data subset of an original user data set if the AAL5 cell that the AAL5 receiver 300 receives does not includes the final data subset of the original user data set. FIG. 3 illustrates the SRAM 301 of the apparatus shown in FIG. 2.

And finally, the SRAM 401 coupled to the AAL2 transmitter 400 stores the CPS packets received, and the CAM 402 stores the parameters necessary for converting the CPS packets to the AAL2 cells.

Reference to the operational steps of a method of converting AAL2 cells to AA5 cells in an ATM network system will now be made in detail.

Initially, when the AAL2 receiver 100 receives the AAL2 cells containing the CPS packets including an original user data set, it extracts each CPS packet by demultiplexing the AAL2 sells, and it sends each CPS packet to the AAL5 transmitter 200. The SRAM 101 and CAM 102 are used to store the data and parameters necessary for demultiplexing the AAL2 cells.

For example, let's assume that the AAL2 receiver 100 is subject to construct a CPS packet, which is included in more than one AAL2 cells, and VP/VC (Virtual Path/Virtual Channel) of an ith AAL2 cell, that the AAL2 receiver receives, is not identical to that of an (i+1)th AAL2 cell. If the ith AAL2 cell includes the fore part of the CPS packet, the AAL2 receiver 100 stores the fore part in the SRAM 101.

Thereafter, when the AAL2 receiver 100 receives another AAL2 cell that contains the following part of the packet, it completes to construct a complete CPS packet by combining the both parts. Finally, the AAL2 receiver 100 sends the CPS packet to the AAL5 transmitter 200.

Figure 6:
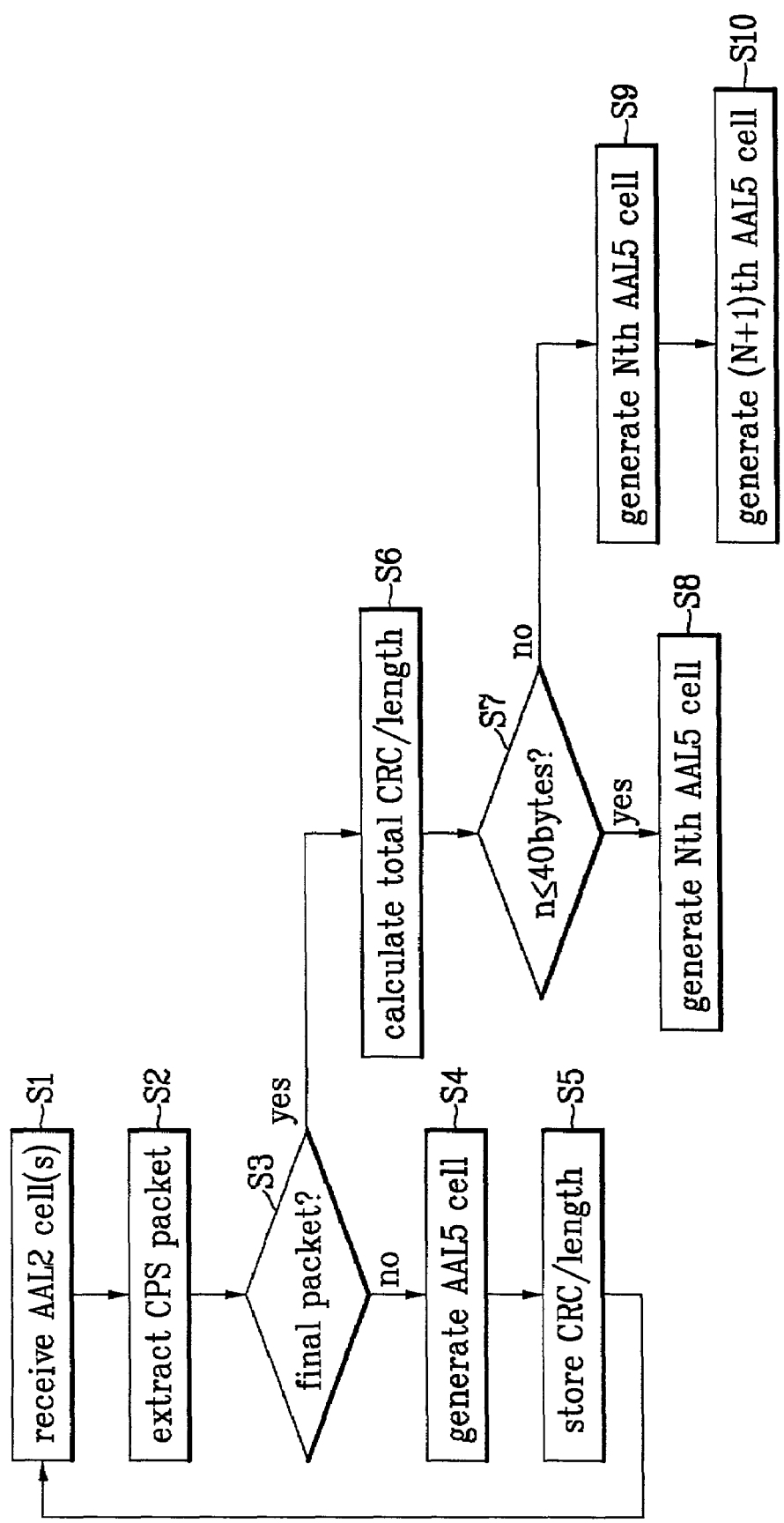
FIG. 6 illustrates a method of converting AAL2 cells to AAL5 cells in accordance with the present invention.
Figure 7:
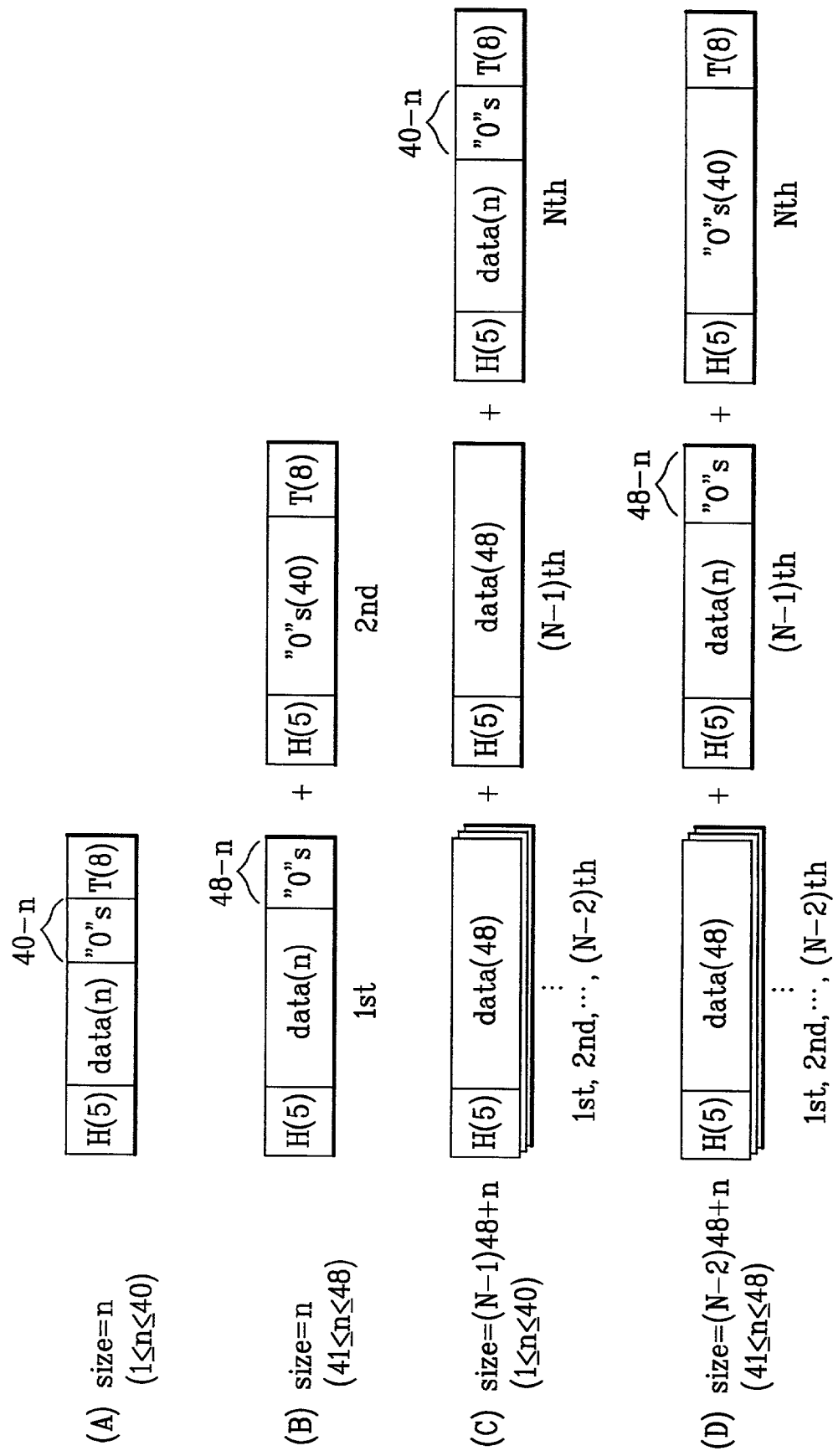
FIG. 7 illustrates the structures of the AAL5 cells that the AAL5 receiver 300 receives.

FIG. 6 illustrates a method of converting AAL2 cells in an ATM network system according to the present invention. In addition, FIG. 7 illustrates the AAL5 cells generated by the AAL5 transmitter 200 in accordance with the present invention.

Initially, the AAL2 receiver 100 receives one or more AAL2 cells that include a CPS packet including one of N data subsets of an original user data set (S1).

Next, the AAL2 receiver 100 extracts the CPS packet from the AAL2 cells received in the step S1 (S2) and sends the extracted to the packet to the AAL5 transmitter 200. The CPS packet extracted in the step (S2) includes a CPS packet header including a UUI field set to 26.

Then the AAL5 transmitter 200 checks whether the extracted CPS packet is a final CPS packet by checking the UUI field included in the packet (S3).

If it is determined from the step S3 that the packet is "not final" (UUI=27), it generates a corresponding AAL5 cell by adding an ATM header, whose PTI field is set to "000" (not final), to the data subset included in the CPS packet received (S4).

Thereafter, the transmitter 300 stores intermediate CRC and length values of the data subset included in the generated AAL5 cell in the SRAM 201 (S5), and it outputs the AAL5 cell generated.

The steps S1 to S5 are repeated until it is determined in the step S3 that the CPS packet extracted in the step S2 is a final CPS packet that includes an Nth data subset having its size of n bytes.

After the AAL5 transmitter 200 finally receives the final CPS packet whose UUI field is set to 26 (final), the transmitter 200 calculates the total CRC and length values of the original user data set by adding the sum of the intermediate CRC and length values of the data included in each AAL5 generated in the step S4 with the last CRC and length values of the Nth data subset (S6). The total length value turns out to be (N−1)*48+n.

Next, the transmitter 200 determines whether the size of the Nth data subset is less than 41 (S7).

Figure 5:
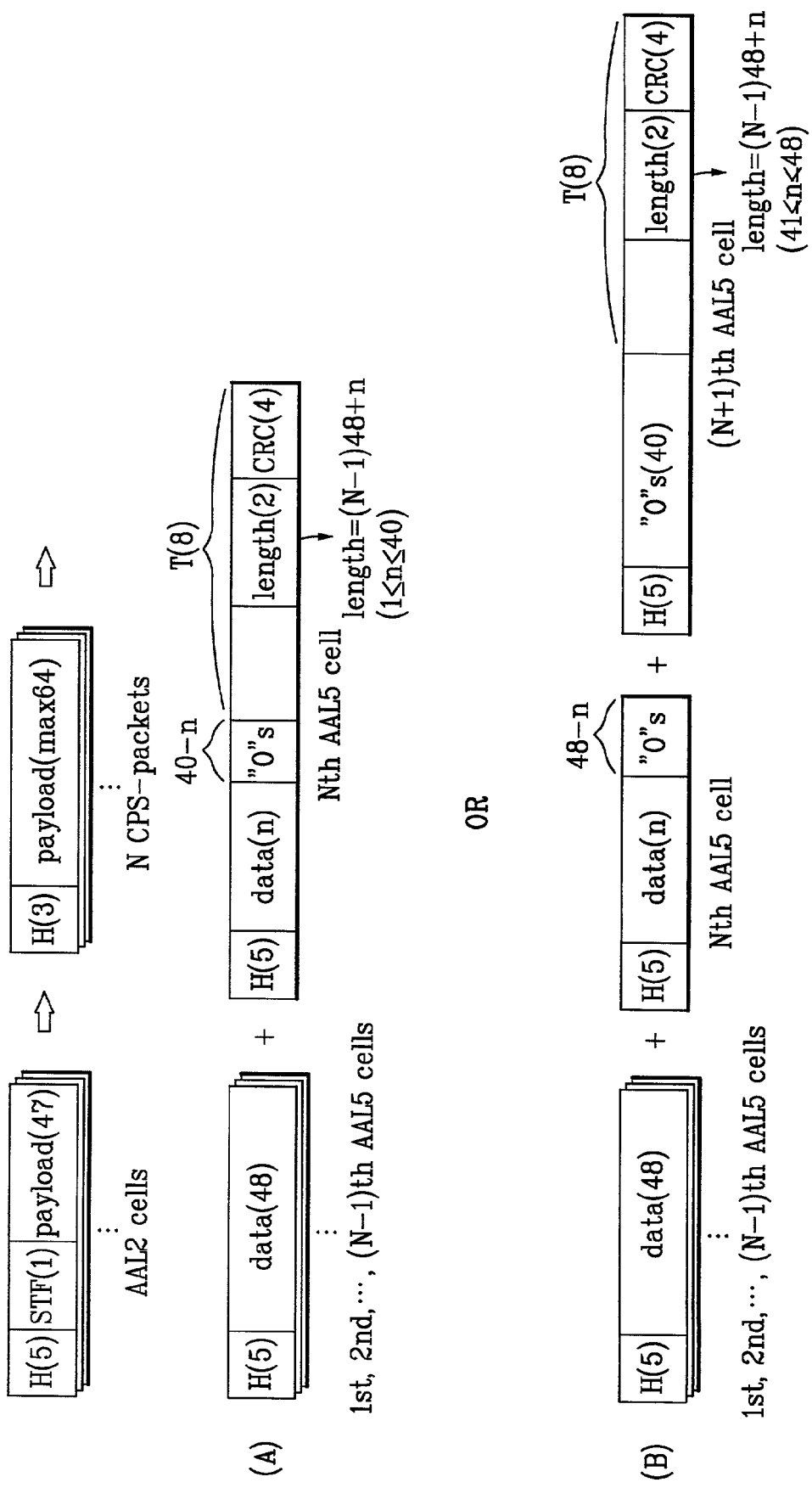
FIG. 5 illustrates the structures of the AAL5 cells that the AAL5 transmitter 200 generates.

If n<41, the transmitter 200 generates an Nth (last) AAL5 corresponding to the final CPS packet by adding an ATM header whose PTI is set to "001" (final) ad by adding a trailer containing the total CRC and length values to a payload that contains the Nth data subset (S8). The construction of the Nth (last) AAL5 cell generated in the step (S8) is shown in FIG. 5A.

If n>40, the transmitter 200 initially generates an Nth AAL5 cell by adding an ATM header whose PTI field is set to "000" (not final) to a payload that includes the Nth data subset (S9). Next, it generates an (N+1)th (last) AAL5 cell by adding an ATM header whose PTI is set to "001" (final) to a payload that includes 40 zeros a trailer (T) including the total CRC and length values. The construction of the (N+1) th (last) AAL5 cell generated in the step (S10) is shown in FIG. 5B.

Reference to the operational steps of a method of converting AAL5 cells to AA2 cells in an ATM network system will now be made in detail.

FIG. 6A illustrates an AAL5 cell that includes a user data set having a size n where $1 \leq n \leq 40$. When the AAL5 receiver 300 receives an AAL5 cell shown in FIG. 6A, the AAL5 receiver 300 extracts the n bytes user data set by using the length of the data set. The length information is included in the trailer field (T). Thereafter, it generates a CPS packet by adding a CPS packet header to the extracted user data set and sends the packet to the AAL2 transmitter 400.

Let's consider a second case where the AAL5 receiver 300 receives the AAL5 cells shown in FIG. 6B. The AAL5 cells include a user data set having a size n where $41 \leq n \leq 48$. When the AAL5 receiver 300 receives the first AAL5 cell, it checks the PTI field included in the ATM header. Since PTI is set to "000" (not final), the AAL5 receiver 300 stores the 48 bytes payload of the first cell in the SRAM 301 coupled to the AAL5 receiver 300.

After the receiver 300 receives the second AAL5 cell, the receiver is able to extract the user data from the payload stored in the SRAM 301 using the user data length included in the trailer of the second cell. Thereafter, it generates a CPS packet by adding a CPS packet header to the extracted user data set and sends the packet to the AAL2 transmitter 400.

Figure 8:
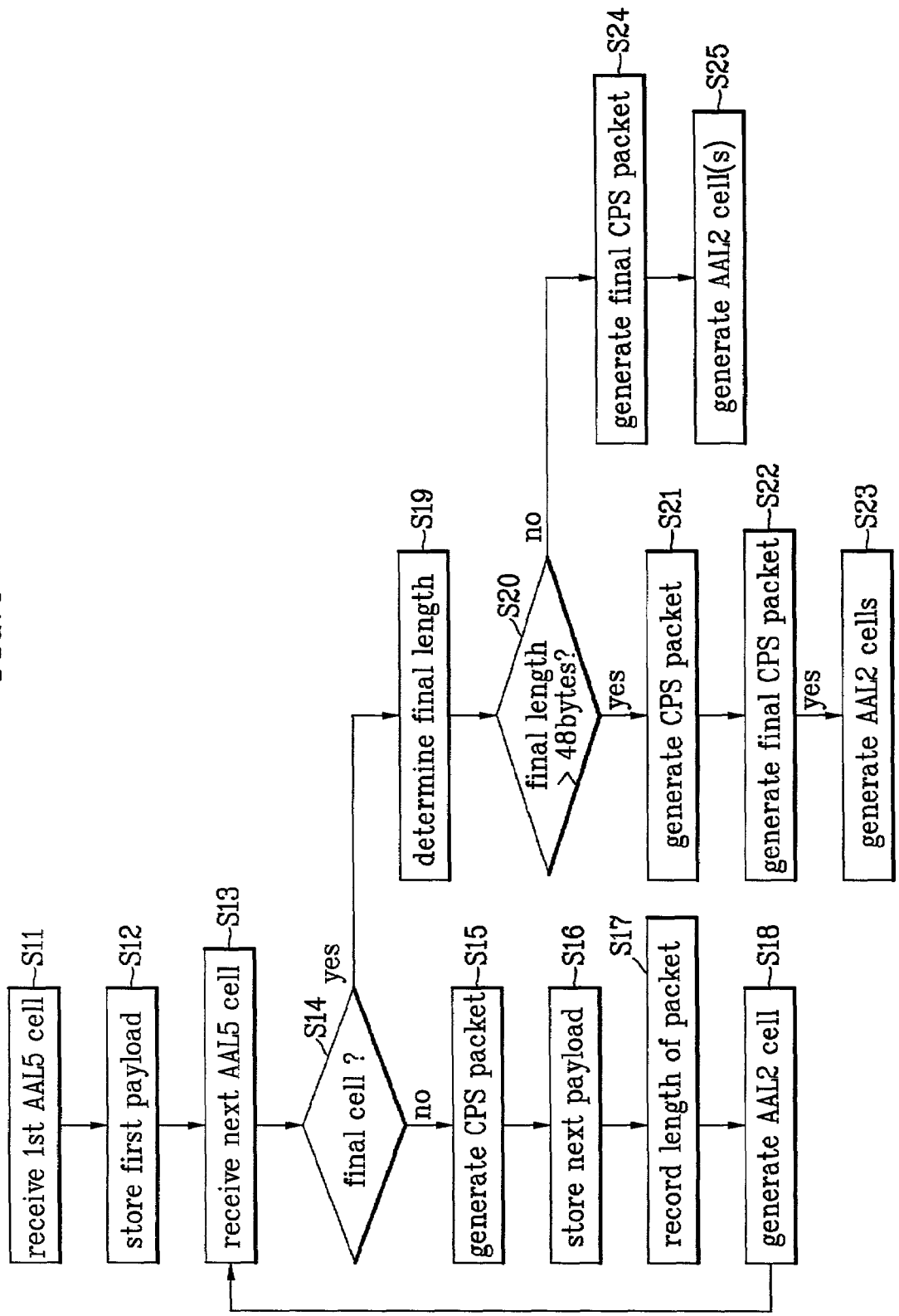
FIG. 8 illustrates a method of converting AAL5 cells to AAL2 cells in accordance with the present invention.

Now, let's consider a general case where the AAL5 receiver 300 receives N (two or more) AAL5 cells shown in FIG. 6C or FIG. 6D. FIG. 8 illustrates a method of converting one or more AAL5 cells in an ATM network system according to the present invention.

First of all, when the receiver 300 receives a first AAL5 cell that includes a first payload including a first data subset of an original user data set (S1), it checks the PTI field included in the ATM header of the first cell.

Since PTI is set to "000" (not final), the receiver 300 stores the payload of the first cell in the SRAM 301 coupled to the receiver 300 (S12).

Next, the receiver 300 receives a next AAL5 cell that includes a next payload including a next data subset of the original user data set (S13), and it checks whether the received next AAL5 cell is a final AAL5 cell by checking the PTI of the received cell (S14).

If the received cell is not a final cell, the receiver 300 determines that the payload stored in the SRAM 301 is valid. Therefore, it generates a CPS packet by adding a packet header to the payload stored in the SRAM 301 (S15), and it sends the packet to the AAL2 transmitter 400. Next, the receiver 300 empties the SRAM 301 and stores the next payload included in the next AAL5 received in the step S13 in the SRAM 301 (S16).

Thereafter, the receiver 300 records the length of the payload included in the packet sent to the AAL2 transmitter 400 (S17).

When the AAL2 transmitter 400 receives the CPS packet generated in the step S15, it generates one or more AAL2 cells corresponding to the CPS packet received (S18).

The receiver 300 performs the steps S13 to S18 until it is determined in the step (S14) tat the next AAL5 received in the step S13 is a final AAL5 cell that includes a final payload.

When the receiver 300 finally receives a AAL5 cell whose PTI is set to "001" (final), the total length of the original user data set is given. Therefore, the receiver 300 determines a final length, which is the length of the unsent data, by subtracting each length stored in the step S17 from the total length of the original user data set (S19).

Next, the receiver 300 determines whether the final length is greater than 48 (S20).

If the final length is greater than 48 bytes as shown in FIG. 7 (C), the receiver generates a CPS packet by adding a packet header to the payload recently stored in the SRAM 301 in the step S17 (S21). Thereafter, it extracts a final data subset of the original user data set from the final payload, and it generates a final CPS packet by adding a packet header to the extracted final data subset (S22). The UUI field of the final CPS packet is set to 27.

Thereafter, it sends both packets to the AAL2 transmitter 400. The AAL2 transmitter 400 generates one or more AAL2 cells corresponding to each packet received (S23).

If the final length calculated in the step S19 is less than 49 bytes as shown in FIG. 7(D), the receiver 300 extracts a final data subset of the original user data set from the payload recently stored in the SRAM 301, and it generates a final CPS packet by adding a packet header to the extracted final data subset (S24). Similarly, the UUI field of the final CPS packet is set to 27. Thereafter, it sends the final packet to the AAL2 transmitter 400. Similarly, the transmitter 400 generates one or more AAL2 cells corresponding to the final CPS packet (S25).

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of converting AAL2 cells in an ATM network system, the method comprising:
   (a) receiving one or mote AAL2 cells that include a Common Part Sublayer (CPS) packet including one of N data subsets of an original user data set;
   (b) extracting said CPS packet from said one or mote AAL2 cells received in (a);
   (c) generating an AAL5 cell by adding an ATM header to said data subset included in said CPS packet;
   (d) storing intermediate CRC and length values of said data subset included in said AAL5 cell generated in (c) in a memory without storing the data subset of the generated cell; and
   (e) repeating (a) to (d) until said CPS packet extracted in (b) is a final CPS packet that includes an Nth data subset having its size of n bytes.

2. The method of claim 1, further comprising (f) calculating total CRC and length values of said original user data set.

3. The method of claim 2, further comprising:
   (g) generating an Nth AAL5 cell corresponding to said final CPS packet by adding a trailer containing said total values to a payload containing said Nth data subset if $1 \leq n \leq 40$.

4. The method of claim 2, further comprising:
   (h) generating an Nth AAL5 cell that includes said Nth data subset if $41 \leq n \leq 48$; and
   (i) generating an (N+1)th AAL5 cell that includes a trailer containing said total values.

5. The method of claim 2, wherein said total values are calculated by using each intermediate CRC value and length value stored in said memory and last CRC and length values of said Nth data subset.

6. The method of claim 1, wherein each CPS packet extracted in (b) includes a CPS packet header including a UUI field set to 26.

7. The method of claim 1, wherein each AAL5 cell generated in (c) includes an ATM header including a PTI field set to "000".

8. The method of claim 5, wherein said total CRC value of said original user data set is calculated by adding each intermediate CRC value stored in said memory with said last CRC value of said Nth data subset included in said final CPS packet.

9. The method of claim 5, wherein said total length value of said original user data set is calculated by adding each intermediate length value stored in said memory with said last length value of said Nth data subset included in said final CPS packet.

10. The method of claim 3, wherein said payload of said Nth AAL5 cell generated in (g) includes (40−n) zeros.

11. A method of converting AAL5 cells in an ATM network system, the method comprising:
    (a) receiving a first AAL5 cell that includes a first payload including a first data subset of an original user data set;
    (b) storing said first payload in a memory if said first cell is not a final AAL5 cell;
    (c) receiving a next AAL5 cell that includes a next payload including a next data subset of said original user data set;
    (d) generating a CPS packet by adding a packet header to said payload stored in said memory if said AAL5 cell received in (c) is not said final AAL5 cell;
    (e) emptying said memory and storing said next payload in said memory;
    (f) recording the length of said payload included in said generated packet;
    (g) generating one or more AAL2 cells corresponding to said CPS packet generated;
    (h) repeating (c) to (g) until said next AAL5 cell received in (c) is said final AAL5 cell that includes a final payload; and
    (i) determining a final length by subtracting each length recorded in (f) from a total length of said user data set said total length being included in said final AAL5 cell, wherein the final length comprises a length of the unsent data of the original user data set.

12. The method of claim 11, further comprising:
    (j) generating a CPS packet by adding a packet header to said payload recently stored in said memory in (e) if said final length is greater than 48;
    (k) extracting a final data subset of said original user data set from said final payload; and
    (l) generating a final CPS packet by adding a packet header to said extracted final data subset.

13. The method of claim 12, further comprising:
    generating one or more AAL2 cells corresponding to said packet generated in (j); and
    generating one or more AAL2 cells corresponding to said final packet generated in (l).

14. The method of claim 11, further comprising:
    extracting a final data subset of said original user data set from said payload recently stored in said memory if said final length is less than 49; and
    generating a final CPS packet by adding a packet header to said extracted final data subset.

15. The method of claim 14, further comprising generating one or more AAL2 cells corresponding to said final CPS packet.

16. The method of claim 11, wherein said final AAL5 cell includes its PTI field set to "001".

17. The method of claim 14, wherein said final CPS packet generated contains its UUI field set to 27.

18. The method of claim 14, wherein said final CPS packet generated contains its UUI field set to 27.

* * * * *